United States Patent [19]

Crews et al.

[11] Patent Number: 4,970,696

[45] Date of Patent: Nov. 13, 1990

[54] METHOD FOR CONDUCTING THREE-DIMENSIONAL SUBSURFACE AND MARINE SEISMIC SURVEYS

[75] Inventors: Gary A. Crews; James A. Musser, both of Plano, Tex.

[73] Assignee: Atlantic Richfield Company, Los Angeles, Calif.

[21] Appl. No.: 495,250

[22] Filed: Mar. 16, 1990

Related U.S. Application Data

[63] Continuation-in-part of Ser. No. 218,662, Jul. 13, 1988, Pat. No. 4,930,110.

[51] Int. Cl.$^5$ ............................ G01V 1/20; G01V 1/36
[52] U.S. Cl. .......................................... 367/15; 367/56; 364/421
[58] Field of Search ...................... 367/15, 56, 58, 72; 364/421

[56] References Cited

U.S. PATENT DOCUMENTS

| | | | |
|---|---|---|---|
| 2,336,053 | 12/1943 | Athy et al. | 367/56 |
| 3,431,999 | 3/1969 | Glazier | 367/56 |
| 3,753,222 | 8/1973 | Trostle | 367/56 |
| 3,934,220 | 1/1976 | Davis | 367/58 |
| 4,001,770 | 1/1977 | Hafer | 367/58 |
| 4,403,312 | 9/1983 | Thomason | 367/56 |
| 4,476,555 | 10/1984 | Water et al. | 367/56 |
| 4,567,582 | 1/1986 | Kuhn | 364/421 |
| 4,677,598 | 6/1987 | Julinson | 367/56 |
| 4,930,110 | 5/1990 | Bremner et al. | 367/56 |

OTHER PUBLICATIONS

Larner et al., "Coherent Noise In Marine Leisure Data"; Geophysics, vol. 48, No. 7, 7/83, pp. 854–886.

Primary Examiner—Nelson Moskowitz
Attorney, Agent, or Firm—Albert C. Metrailer

[57] ABSTRACT

A method for conducting a three-dimensional subsurface seismic survey utilizing a plurality of seismic receivers arranged in an orthogonally uniform pattern is disclosed. A predetermined pattern of shotpoints is arranged such that every point in the surface area of interest is sampled over a desired range of offsets and a full range of azimuths. The utilization of shotpoints outside the pattern of receivers allows examination of a subsurface area which is greater than the area of the pattern itself. The output of each receiver in the pattern is simultaneously recorded for seismic energy applied to the surface of the earth. Where the area of interest is quite large, a multitude of patterns of seismic receivers may be utilized to ensure coverage of the entire area. In a marine application of the present invention a plurality of seismic receivers are arranged in an orthogonally uniform pattern under a body of water or by utilizing multiple parallel marine streamers towed by one or more tow boats. One or more source boats are then utilized to produce a plurality of shotpoints such that every point in the subsurface area of interest is sampled over a desired range of offsets and azimuths.

10 Claims, 3 Drawing Sheets

METHOD FOR CONDUCTING THREE-DIMENSIONAL SUBSURFACE AND MARINE SEISMIC SURVEYS

CROSS-REFERENCE TO RELATED APPLICATION

The present invention is a continuation-in-part of U.S. patent application Ser. No. 07/218,662, filed Jul. 13, 1988, entitled "Method for Conducting Three-Dimensional Subsurface Seismic Surveys," now U.S. Pat. No. 4,930,110.

BACKGROUND OF THE INVENTION

1. Field of the Invention:

This invention relates in general to methods for conducting subsurface and marine seismic surveys and in particular to methods particularly suited for conducting three-dimensional subsurface and marine seismic surveys.

2. Description of the Prior Art:

The concept of three-dimensional seismic surveying is well known in the prior art. Heretofor, in order to accurately construct an image of an unknown subsurface structure in three dimensions, without introducing a directional bias to the data, each common reflection point must be sampled from a large number of azimuths and distances or "offsets". This is generally accomplished by taking repetitive measurements and utilizing statistical processing methods to focus the image. The small channel recording systems currently available do not readily permit the sampling necessary to accomplish three-dimensional surveying without the necessity of adding shotpoints, repetitively moving the receivers, and/or repeatedly driving the seismic sources over the recording equipment to obtain the necessary azimuths and offsets. In view of the difficulty in obtaining these measurements several alternative methods have been proposed.

One such alternative method is the so-called "seisloop" method. This method utilizes deploying the available seismic receivers in a loop and imparting seismic waves or "shooting" wherever possible around the loop. This technique provides reasonable azimuthal information; however, offset information is generally limited in most areas of the survey.

A second alternative method is referred to as the "swath" technique. This approach utilizes several parallel lines of receivers separated by a distance greater than the in-line receiver interval. A series of seismic waves are imparted into the receiver configuration in an in-line or split spread manner. In this manner, fairly uniform offset information is provided along the center line of the swath; however, the outer line have considerably less uniform offset distributions. Shotpoint movement is limited in this technique to directions parallel to the receiver lines (to avoid driving over receiver lines), therefore a minimal amount of azimuthal information is acquired. This is further complicated by the fact that virtually all of the azimuthal data acquired have very short shot-receiver offsets.

In land surveys the designer of three-dimensional surveys must be concerned with noises commonly called ground roll. These noises are not as common in marine surveys, but do exist and must be considered especially in shallow water. Additionally, noise may be created by scattered reflections from subsea irregularities such as islands or mounds. These are described in a paper by Larner et al. 1983, "Coherent Noise In Marine Seismic Data," Geophysics, Volume 488 pp. 854–886.

As noted above, each of the aforementioned techniques suffer certain defects and it may also be shown that neither of the above-referenced methods can provide the uniform lateral sampling necessary to properly sample coherent noises or the information coupling between the source, receiver and substance to allow adequate processing. Therefore, it should be apparrarent that a need exists for an improved seismic survey method which can be utilized to obtain three-dimensional subsurface seismic surveys.

SUMMARY OF THE INVENTION

It is therefore one object of the present invention to provide an improved seismic survey method.

It is another object of the present invention to provide an improved seismic survey method which provides improved azimuthal and offset information.

It is yet another object of the present invention to provide an improved seismic survey method which provides uniform lateral sampling so that out-of-plane coherent noise may be properly sampled.

The foregiong objects are achieved as is now described. The method of the present invention utilizes a plurality of seismic receivers which are arranged in multiple orthogonally uniform patterns. A predetermined pattern of shotpoints is arranged such that every point in the subsurface area of interest is sampled over a desired range of offsets and azimuths. The utilization of shotpoints outside the pattern of receivers allows examination of a subsurface area greater than the area of the pattern itself. The output of each receiver in the pattern is simultaneously recorded for each series of seismic waves applied to the surface of the earth. Where the area of interest in quite large, a multitude of patterns of seismic receivers may be utilized to ensure coverage of the entire area. In a marine application of the present invention a plurality of seismic receivers are arranged in an orthogonally uniform pattern by utilizing multiple parallel marine streamers towed by one or more recorder boats or placed on the bottom, by cable, anchors or divers. One or more source boats are then utilized to produce a plurality of shotpoints such that every point in the subsurface area of interest is sample over desired range of offsets and azimuths.

The above as well as additional objects, features, and advantages of the invention will become apparent in the following detailed description.

BRIEF DESCRIPTION OF THE DRAWING

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
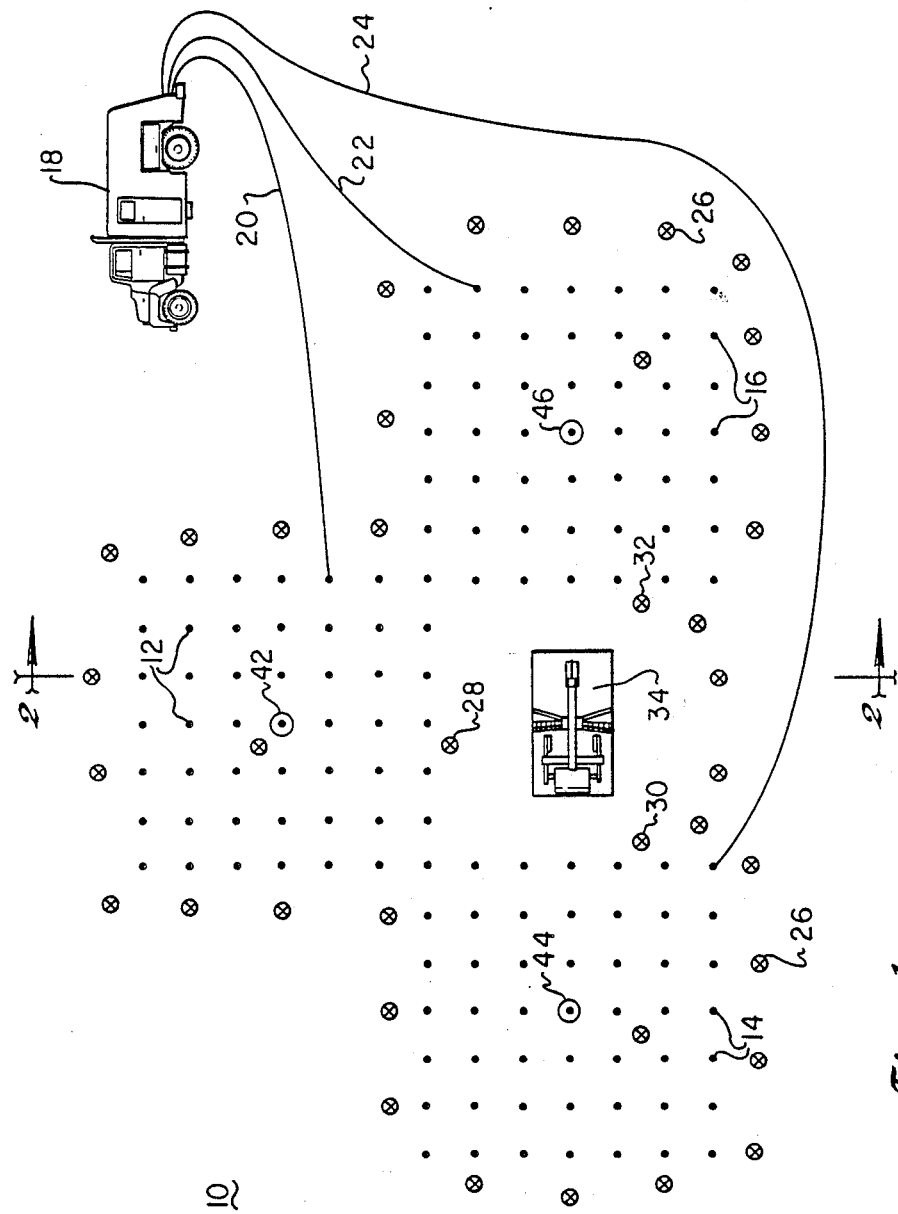
FIG. 1 is a schematic representation of a surface view of the seismic exploration method of the present invention.

With reference now to the figures and in particular with reference to FIG. 1, there is depicted a schematic representation of a surface view of the seismic exploration method of the present invention. As can be seen, a survey is being conducted over a portion of the surface of the earth 10. Multiple patterns of seismic receivers 12, 14 and 16 are utilized in conjunction with the method of the present invention, each pattern consisting of an orthogonally uniform distribution of geophone groups which are preferably disposed on an orthogonal grid having uniformly distributed vertices. In a preferred embodiment of the present invention, these vertices are preferably at least ten feet apart and preferably less than one thousand feet apart.

In accordance with one aspect of the present invention, patterns 12, 14 and 16 do not necessarily overlap, as depicted. In this manner, obstacles such as building or oil producing facility 34 maybe placed into a gap in the patterns of the survey. As will be apparent upon reference to the present invention, it will then be possible with the present invention to adjust the so-called "shotpoints" or sites of seismic wave application to accommodate these obstacles without causing a gap in the seismic survey.

As is typical in known seismic survey systems, each seismic receiver or geophone in pattern 12, 14 or 16 is coupled via optical or electrical transmission lines, or a suitable telemetry system to a recording truck 18. In the depicted embodiment, each pattern is coupled to recording truck 18 by a data line, such as data lines 20, 22 and 24 respectively. Thus, it is possible to simultaneously record the responses of each seismic receiver in one or more pattern during seismic exploration.

Still referring to FIG. 1, it can be seen that each orthogonally uniform pattern 12, 14 and 16 is preferably disposed about a selected point on the earth's surface. That is, pattern 12 is disposed about point 42, pattern 14 is disposed about point 44 and pattern 16 is disposed about point 46. Next, for each pattern in the survey at least one seismic wave is imparted into the earth at a plurality of locations which are all located at variable distances and azimuths from the aforementioned selected points. As utilized herein the term "shotpoints" is extended to include the utilization of modern vibrational sources. As can be seen, a plurality of shotpoints 26 are then selected, each of which is located at a different distance and azimuth from the selected point for each particular pattern.

In accordance with still another aspect of the present invention, it can be seen that at least one shotpoint may be located adjacent to pattern 12, 14 or 16. That is, shotpoint 28 is located adjacent to pattern 12, shotpoint 30 is located adjacent to pattern 16. This feature of the present invention is made possible due to the existence of large open areas between the patterns and the utilization of shotpoints between the patterns make is possible to acquire near offset data from each of these source positions which can dramatically improve the accuracy of the various processing techniques which are ultilized. Of course, far and middle offset data may be determined during the utilization of shotpoints which are disposed further outside of each pattern.

The technique described above and illustrated in FIG. 1 is equally applicable to marine three-dimensional seismic surveys with the receiver patterns placed on the bottom of a body of water or suspended above the bottom with the seismic sources either on the bottom or towed through the body of water.

Figure 2:
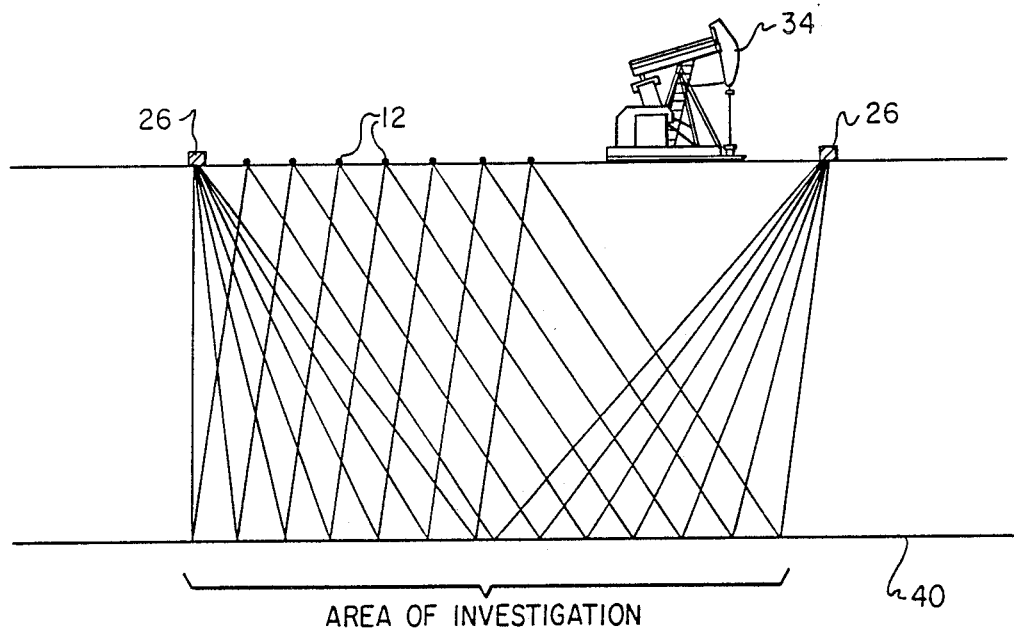
FIG. 2 is a sectional view of the seismic exploration method of the present invention taken along line 2—2 of FIG. 1.

Referring now to FIG. 2, there is depicted a sectional view of the seismic exploration method of the present invention taken along line 2-2 of FIG. 1. In this manner, it can be seen that it is possible to obtain a seismic survey of subsurface strata beneath an obstacle such as oil producing facility 34 without the necessity of placing a pattern of geophones within the space occupied by the obstacle. As can be seen, careful consideration of the placement of shotpoints 26 to obtain the desired offset and azimuth make it possible to accurately survey an area of subsurface formation 40 which may greatly exceed that the area of pattern 12. Thus, the presence of an obstacle such as oil producing facility 34 need no longer have the effect of causing a skip or blank within the survey obtained since the method of the present invention permits planning of the placement of each individual pattern to accommodate such obstacles.

Figure 3:
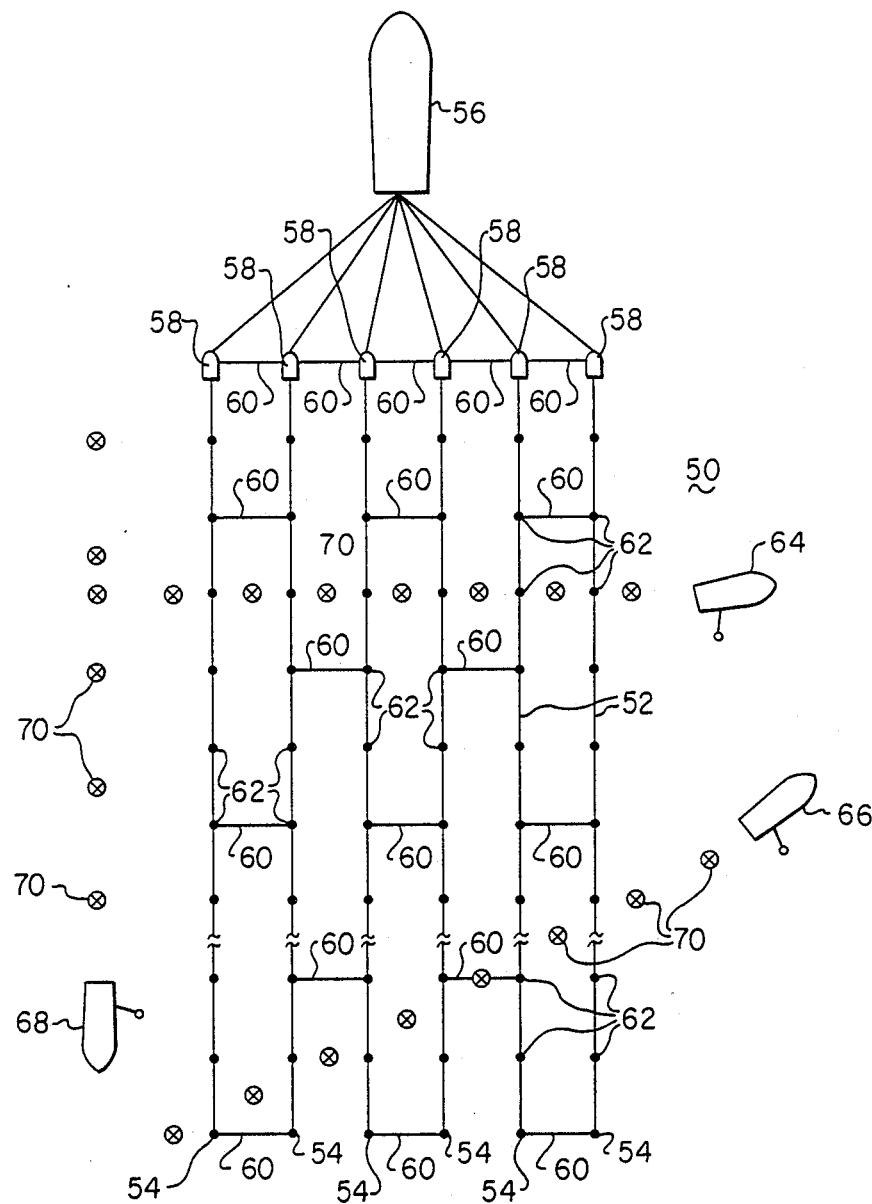
FIG. 3 is a schematic representation of a surface view of the seismic exploration method of the present invention in a marine environment using streamers.

With reference now to FIG. 3 there is depicted a schematic representation of a surface view of the seismic exploration method of the present invention in a marine environment. As may be seen, a survey is conducted over a portion of the surface of a body of water 50. A pattern 52 of seismic receivers is utilized in conjunction with the method of the present invention. Pattern 52 comprises an orthogonally uniform distribution of hydrophones 62 which are preferably disposed on an orthogonal grid having uniformly distributed vertices. In a preferred embodiment of the present invention this orthogonally uniform distribution is accomplished utilizing a plurality of marine streamers 54 which are towed behind a recording boat 56. Each streamer 54 is depicted as towed behind a paravane 58; however, those skilled in the art will appreciate that small drone crafts or semisubmersibles may also be utilized to tow multiple streamers 54.

While paravanes 58 or other means may be utilized to ensure uniform spacing between each streamer 54, those skilled in this art will appreciate that a plurality of spacer 60 may also be utilized to ensure uniform spacing of streamers 54. In a preferred embodiment of the present invention each streamer 54 comprises a relatively short marine streamer of approximately 1500 meters in length and streamers 54 are preferably separated by a distance of approximately 25 meters. Each streamer 54 preferably has a 25 m group interval requiring a 240 to 480 channel recording system. Recording boat 56 will preferably traverse a predetermined course at a relatively slow speed, such as three to four knots, and will carry all required recording equipment.

Next, as discussed above with respect to FIG. 1, a plurality of seismic waves are imparted into the earth at a plurality of location which are disposed at variable distances and azimuths from a selected point from within pattern 52. Of course, the fact the pattern 52 is moving slowly will require some offset calculation; however, this is a trivial matter which may be simply determined.

As illustrated, seismic waves are generated, in a conventional manner, utilizing a plurality of small source boats 64, 66 and 68 which each traverse a predetermined track and fire an air gun or other seismic source at a plurality of shotpoints 70. The use of multiple source boats traversing the area of various angles with respect to the track of recording boat 56 will provide an azimuthal distribution of data while also achieving a desirable offset distribution. Since the source and recording receivers are towed by different boats lower fold data may be collected while maintaining an excellent signal-to-noise ratio. Also, as discussed above, certain shotpoints 70 may be located within pattern 52, permitting near offset data to be acquired, thereby improving the accuracy of the processing technique.

Another advantage of the marine embodiment of the present invention is the fact that source boats 64, 66 and 68 may simply be implemented utilizing any available boat since the source boats do not require recording instrumentation. Further, since the source intervals for each source boat may be larger, less compressor capacity is required, allowing the utilization of smaller boats. Since small source boats are utilized which do not tow marine streamers, the source boats may move more quickly from shotpoint to shotpoint allowing rapid positioning for seismic surveys.

Upon reference to the foregoing specification, those skilled in the art will appreciate that the method of the present invention provides an operator with the ability to obtain a true three-dimensional seismic survey, due to the wide range of offsets and azimuths which are sampled, by utilizing a well designed survey in accordance with the teaching of the present invention. Further, the method of the present invention permits the operator to adjust the range of offset and azimuths which will be acquired to meet practical geophysical or economic constraints. For example, in those cases where the subsurface structures and velocities are not complex or wherein the exploration budget will not permit detailed surveying, it is possible to design a survey which provides only the information necessary to produce a focussed image.

An additional advantage of the present invention is that the uniform sampling intervals provided by the mutually orthogonal pattern of seismic receivers make it possible to use processing techniques to attenuate unwanted coherent noise trains. Where the intervals between seismic receivers are sufficiently small to avoid aliasing of the noises, the uniform sampling provided in accordance with the present invention in two orthogonal directions makes it possible to characterize these noises accurately in both time and space. In this manner it is possible to design a filter to effectively attenuate these noises. Similarly, the uniform orthogonal pattern of seismic receivers utilized in the present invention makes it possible to sample the velocity field within the earth's surface in three dimesions in order to derive estimates of the three-dimensional velocity field from the data obtained. Previously known techniques have only allowed the inference of the three-dimensional velocity field from two orthogonal velocity estimates.

Finally, as discussed for the land technique above, the utilization of the spaces available within each seismic receiver pattern make it possible to occupy shotpoints within the pattern to provide near offset data. Additionally, in both the land and marine case, the areal distribution of the shotpoints utilized in this technique provides a wide variety of azimuthally distributed information which is not typically obtained with known "pseudo" three-dimensional techniques.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method for conducting three-dimensional marine seismic surveys comprising the steps of:
   towing a plurality of seismic receivers along a first predetermined track in an orthogonally uniform pattern within a body of water wherein gaps are formed within said orthogonally uniform pattern;
   imparting seismic energy into the earth at a plurality of locations, each of said locations disposed in a particular azimuthal direction and a selected distance from said orthogonally uniform pattern;
   simultaneously recording the responses of each of said plurality of seismic receivers to said seismic energy imparted at each of said plurality of locations;
   characterizing the time spatial nature of unwanted noise within said recorded responses by utilizing the uniform sampling intervals provided by said orthogonally uniform pattern; and
   processing said recorded responses to remove said characterized unwanted noise.

2. The method of conducting three-dimensional marine seismic surveys according to claim 1 further including the step of imparting seismic energy into the earth at a selected location within said orthogonally uniform pattern wherein near offset data may be obtained.

3. The method for conducting three-dimensional marine seismic surveys according to claim 1 wherein said step of imparting seismic energy into the earth at a plurality of locations, each of said locations disposed in a particular azimuthal direction and a selected distance from said orthogonally uniform pattern comprises the step of traversing a second predetermined track with a seismic source boat while selectively activating said seismic source.

4. The method for conducting three-dimensional marine seismic surveys according to claim 1 wherein said step of imparting seismic energy into the earth at a plurality of locations, each of said location disposed in a particular azimuthal direction and a selected distance from said orthogonally uniform pattern comprises the step of traversing multiple predetermined tracks with a plurality of seismic source boats while selectively activating said seismic sources.

5. The method for conducting three-dimensional marine seismic surveys according to claim 1 wherein said step of towing a plurality of seismic receivers along a first predetermined track in an orthogonally uniform pattern within a body of water comprises the step of towing a plurality of marine streamers along multiple predetermined parallel tracks.

6. A method for conducting three-dimensional marine seismic surveys comprising the steps of:
   situating a plurality of seismic recievers in an orthogonally uniform pattern under the surface of a body of water wherein gaps are formed within said orthogonally uniform pattern;
   imparting seismic energy into the earth at a plurality of locations, each of said locations disposed in a particular azimuthal direction and a selected distance from said orthogonally uniform pattern;
   simultaneously recording the responses of each of said plurality of seismic receivers to said seismic energy imparted at each of said plurality of locations;

characterizing the time spatial nature of unwanted noise within said recorded responses by utilizing the uniform sampling intervals provided by said orthogonally uniform pattern; and processing said recorded responses to remove said characterized unwanted noise.

7. The method for conducting three-dimensional marine seismic surveys according to claim 6 further including the step of imparting seismic energy into the earth at a selected location within said orthogonally uniform pattern wherein near offset data may be obtained.

8. The method for conducting three-dimensional marine seismic surveys according to claim 6 wherein said step of imparting seismic energy into the earth at a plurality of locations, each of said locations disposed in a particular azimuthal direction and a selected distance from said orthogonally uniform pattern comprises the step of traversing a predetermined track with a seismic source boat while selectively activating said seismic source.

9. The method for conducting three-dimensional marine seismic surveys according to claim 6 wherein said step of imparting seismic energy into the earth at a plurality of locations, each of said locations disposed in a particular azimuthal direction and a selected distance from said orthogonally uniform pattern comprises the step of traversing multiple predetermined tracks with a plurality of seismic source boats while selectively activating said seismic sources.

10. The method for conducting three-dimensional marine seismic surveys according to claim 1 wherein said step of situating a plurality of seismic receivers along a predetermined track in an orthogonally uniform pattern under the surface of a body of water comprises the step of towing a plurality of marine streamers under the surface of said body of water along multiple predetermined parallel tracks.

* * * * *